United States Patent
Yun et al.

(10) Patent No.: US 11,655,337 B2
(45) Date of Patent: May 23, 2023

(54) POLYIMIDE PRECURSOR SOLUTION AND METHOD FOR PRODUCING SAME

(71) Applicant: LG CHEM, LTD., Seoul (KR)

(72) Inventors: Cheolmin Yun, Daejeon (KR); Kyungjun Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 1189 days.

(21) Appl. No.: 16/076,260

(22) PCT Filed: Jul. 17, 2017

(86) PCT No.: PCT/KR2017/007658
§ 371 (c)(1),
(2) Date: Aug. 7, 2018

(87) PCT Pub. No.: WO2018/021747
PCT Pub. Date: Feb. 1, 2018

(65) Prior Publication Data
US 2021/0179780 A1    Jun. 17, 2021

(30) Foreign Application Priority Data

Jul. 26, 2016  (KR) .......................... 10-2016-0094851
Jun. 27, 2017  (KR) .......................... 10-2017-0080993

(51) Int. Cl.
*C08L 79/08* (2006.01)
*C08G 73/10* (2006.01)
*C08J 5/18* (2006.01)
*C08K 5/5415* (2006.01)

(52) U.S. Cl.
CPC .............. *C08G 73/106* (2013.01); *C08J 5/18* (2013.01); *C08K 5/5415* (2013.01); *C08L 79/08* (2013.01)

(58) Field of Classification Search
CPC . C08L 79/08; C08G 73/1071; C08G 73/1032; C08J 2379/08
See application file for complete search history.

(56) References Cited

U.S. PATENT DOCUMENTS

| | | | |
|---|---|---|---|
| 9,403,947 B2 | 8/2016 | Katayama et al. | |
| 9,462,688 B2 | 10/2016 | Park et al. | |
| 9,695,283 B2 | 4/2017 | Katayama et al. | |
| 9,868,823 B2 | 1/2018 | Katayama et al. | |
| 2013/0251972 A1* | 9/2013 | Toida .................... | C08G 73/10 428/220 |
| 2015/0183932 A1 | 7/2015 | Katayama et al. | |
| 2016/0251545 A1 | 9/2016 | Yun et al. | |
| 2017/0137571 A1* | 5/2017 | Nakayama ............. | C08G 73/10 |
| 2017/0165879 A1* | 6/2017 | Miyamoto ......... | G02F 1/133305 |
| 2019/0062590 A1 | 2/2019 | Yun et al. | |

FOREIGN PATENT DOCUMENTS

| | | |
|---|---|---|
| JP | 2001-019847 A | 1/2001 |
| JP | 2014-025059 A | 2/2014 |
| JP | 2016-011418 A | 1/2016 |
| KR | 10-2007-0023778 A | 2/2007 |
| KR | 10-2013-0027442 A | 3/2013 |
| KR | 10-2016-0037489 A | 4/2016 |
| KR | 10-2016-0067413 A | 6/2016 |
| TW | 201605977 A | 2/2016 |
| TW | 201610021 A | 3/2016 |
| WO | 2015/183056 A1 | 12/2015 |
| WO | 2016-010003 A1 | 1/2016 |

OTHER PUBLICATIONS

Search Report and Written Opinion issued for PCT Application No. PCT/KR2017/007658 dated Oct. 20, 2017, 11 pages.
European Search Report issued for European Patent Application No. 17834689.6 dated May 7, 2019, 9 pages.
English translation of Office Action issued for Japanese Patent Application No. 2018-538711 dated Jul. 16, 2019, 3 pages.

* cited by examiner

*Primary Examiner* — Gregory Listvoyb
(74) *Attorney, Agent, or Firm* — Rothwell, Figg, Ernst & Manbeck, P.C.

(57) ABSTRACT

The present invention provides a polyimide precursor solution which can enhance the uniformity of a polyimide film and also improve the efficiency of processes by improving liquid curl in a coating process of the polyimide precursor solution. In addition, since polyimide according to the present invention has excellent transparency, heat resistance, mechanical strength and flexibility by comprising a specific structure, the polyimide may be used in various fields, such as substrates for devices, cover substrates for displays, optical films, integrated circuit (IC) packages, adhesive films, flexible printed circuits (FPCs), tapes, touch panels, protective films for optical discs, etc.

8 Claims, 3 Drawing Sheets

Stored for 10 min (Example 1)

Stored for 10 min (Comparative Example 1)

Fig. 3

POLYIMIDE PRECURSOR SOLUTION AND METHOD FOR PRODUCING SAME

TECHNICAL FIELD

Cross-Reference to Related Application(s)

The application is a 35 U.S.C. § 371 National Phase Entry Application from PCT/KR2017/007658, filed on Jul. 17, 2017, and designating the United States, which claims the benefit of priority to Korean Patent Application No. 10-2016-0094851, filed on Jul. 26, 2016, and Korean patent Application No. 10-2017-0080993, filed on Jun. 27, 2016, which are incorporated herein by reference in their entirety for all purposes.

The present invention provides a polyimide precursor solution which has an improved dewetting property of the solution when coated on a substrate.

Background Art

Polyimide (PI) is a polymer having relatively low crystallinity or amorphous structure, and it has advantages such as easy manufacturing process, easy process to make a thin film and no crosslinkable moieties necessary for curing, as well as polymeric properties such as high transparency, excellent thermal and chemical resistance, excellent mechanical and electrical properties, and dimensional stability due to its rigid chain structure. The polyimide is now widely used as an electrical and electronical material for the field of car and aerospace, a flexible circuit board, a liquid crystal alignment film for LCD, an adhesive as well as a coating agent.

However, even though the polyimide is a high performance polymer with excellent thermal stability, mechanical properties, chemical resistance and electrical properties, it does not satisfy the basic requirements for the display area such as colorless transparency, and the thermal expansion coefficient should be further lowered. For example, KAPTON sold by Dupont has low thermal coefficient of about 30 ppm/° C., but it still does not meet the requirement for the plastic substrate. Therefore, now studies for minimizing change in thermal history and optical properties while maintaining the basic properties of the polyimide are underway.

In general, aromatic polyimide has a unique color of dark brown. The reason for this is that electrons can be excited due to a σ electron, a π electron, a nonbonding unshared electron pair within the imide structure, and it can be explained by the theory of charge transfer complex (hereinafter, called CT-complex) induced by π electrons of benzene within a main chain of the polyimide.

In general, the polyimide absorbs light of the wavelength below 400 nm to 500 nm of visible light region, and therefore it shows a complementary color of yellow to red. In order to lower the CT-complex that is an disadvantage of the polyimide, a method of introducing an electron-withdrawing functional group having relatively strong electronegativity such as trifluoromethyl (—$CF_3$), sulfone (—$SO_2$) and ether (—O—) to the main chain of the polyimide is used to lower resonance effect by limiting the movement of π electron. Also introducing a cyclo-olefin structure instead of benzene to the main chain of the polyimide can reduce π electron density to manufacture a colorless transparent polyimide film.

Meanwhile, polyamide-imide has been widely used as an industrial material in the electrical, mechanical, electronic and aerospace fields due to its excellent properties such as thermal resistance, mechanical strength and electrical property. Also, in general, structure of the polyamide-imide is different from that of the polyimide and is known to be soluble in an organic solvent, allowing for the application for an enamel varnish, a coating agent for electrical insulation and paint, which need solution casting.

However, for the application in the display area, it is still necessary to develop a polymer for the flexible display with lower thermal expansion coefficient, high solubility, transparency as well as thermal stability.

DISCLOSURE

Technical Problem

An object of the present invention is to provide a polyimide precursor solution with improved dewetting property during a substrate coating process.

Another object of the present invention is to provide a polyimide film manufactured with the polyimide precursor solution.

Further another object of the present invention is to provide a method for manufacturing the polyimide film by using the polyimide precursor solution.

Technical Solution

In order to solve the above-mentioned technical problems, the present invention provides a polyimide precursor solution comprising:

(a) a polyimide precursor manufactured by reacting monomers of the following Chemical Formulas 1, 2 and 3; and (b) an organic solvent, wherein the polyimide precursor solution has a dewetting ratio of 0% to 0.1% as defined by the following Formula 1:

Dewetting ratio (%)=[(A−B)/A]×100     [Formula 1]

wherein,

A is the area of the polyimide precursor solution in the state that the polyimide precursor solution was completely coated on the substrate (100 mm×100 mm), B is the area of the polyimide precursor solution or the polyimide (PI) film after the polyimide precursor solution or the polyimide film is rolled up from the end of the coated substrate,

[Chemical Formula 1]

[Chemical Formula 2]

[Chemical Formula 3]

wherein, $R_1$, $R_2$, $R_3$ and $R_4$ may be each independently a substituent selected from a halogen atom consisting of —F, —Cl, —Br and —I, a hydroxyl group (—OH), a thiol group (—SH), a nitro group (—$NO_2$), a cyano group, a $C_{1-10}$ alkyl group, a $C_{1-4}$ halogenoalkoxyl group, a $C_{1-10}$ halogenoalkyl group, and a $C_{6-20}$ aryl group, $Q_1$ may be selected from the group consisting of —O—, —$CR_{18}R_{19}$—, —C(=O)—, —C(=O)O—, —C(=O)NH—, —S—, —$SO_2$—, a phenylene group and a combination thereof, wherein $R_{18}$ and $R_{19}$ may be each independently selected from the group consisting of a hydrogen atom, a $C_{1-10}$ alkyl group and a $C_{1-10}$ fluoroalkyl group.

$Q_2$ may be selected from the group consisting of a single bond, —O—, —$CR_{18}R_{19}$—, —C(=O)—, —C(=O)O—, —C(=O)NH—, —S—, —$SO_2$—, a phenylene group and a combination thereof, wherein $R_{18}$ and $R_{19}$ may be each independently selected from the group consisting of a hydrogen atom, a $C_{1-10}$ alkyl group and a $C_{1-10}$ fluoroalkyl group.

According to one embodiment, after coating the polyimide precursor solution on the substrate and then storing the substrate coated with the polyimide precursor solution at a temperature of 20° C. to 30° C. and a humidity of 40% to 80%, the coated polyimide precursor solution may have a dewetting ratio of 0.1% or less.

According to one embodiment, after storing the substrate coated with the polyimide precursor solution at a temperature of 20° C. to 30° C. and a humidity of 40% to 80%, the substrate may be cured at a temperature of 320° C. or higher to form a polyimide film having a dewetting ratio of 0.1% or less.

According to one embodiment, a molar ratio of the total content of the compounds of Chemical Formulas 1 and 2 and the content of the compound of Chemical Formula 3 may be 1:0.98 to 1:0.99.

According to one embodiment, the compound of Chemical Formula 2 may be contained in the content of 13 mol % to 27 mol %, based on 100 mol % of the total content of the compounds of Chemical Formulas 1 and 2.

According to one embodiment, the polyimide precursor may comprise a repeating structure represented by the following Chemical Formulas 4a and 4b.

According to one embodiment, the organic solvent may have the partition coefficient Log P as a positive value, and specifically, it may be selected from N,N-diethylacetamide, DEAc), N,N-diethylformamide (DEF), N-ethylpyrrolidone (NEP), dimethylpropanamide (DMPA), diethylpropanamide (DEPA) or a mixture thereof.

According to one embodiment, the density of the organic solvent may be 1 g/cm³ or less.

According to one embodiment, the polyimide precursor solution may further comprise alkoxysilane, and the residual stress of a support comprising the polyimide manufactured by imidizing the polyimide precursor, which further comprises the alkoxysilane, may be in a range from −5 MPa to 10 MPa, and the absorbance at 308 nm of a DEAc solution comprising the alkoxysilane compound in an amount of 0.001 wt % may be in a range from 0.1 to 0.5 at 1 cm of the measured thickness of the solution.

Specifically, the alkoxysilane may contain at least one structure selected from the compounds of following Chemical Formulas 6a to 6d.

[Chemical Formula 6a]

[Chemical Formula 6b]

[Chemical Formula 6c]

[Chemical Formula 6d]

In order to solve another problem of the present invention, the present invention provides a polyimide film manufactured with the polyimide precursor solution.

According to one embodiment, the polyimide film may have the coefficient of thermal expansion (CTE) as a positive value when cooling the polyimide film after heating thereof, and specifically, the polyimide film may show the coefficient of thermal expansion (CTE) of 0 ppm/° C. to 15 ppm/° C. after heating and then cooling the polyimide film n+1 times (n is an integer equal to or greater than 0) in a range from 100° C. to 450° C.

According to one embodiment, the polyimide film manufactured with the polyimide precursor solution may have the haze of 1 or less.

According to one embodiment, the polyimide film may have the birefringence of in-plane and thickness direction of 0.05 to 0.25.

Further, the present invention provides a method for manufacturing a polyimide film comprising the following steps of:

spreading and coating the polyimide precursor solution on a substrate; and heat-treating the polyimide precursor solution coated on a substrate at a temperature of 320° C. or higher.

According to one embodiment, the viscosity of the polyimide precursor solution may be controlled from 2,000 cp to 8,000 cp.

According to one embodiment, the polyimide precursor solution may contain a solid content of 8% to 18 wt % based on the polyimide precursor solution.

According to one embodiment, the heat-treating process may be conducted by heating at a temperature of 320° C. to 500° C. for 20 min to 60 min.

In order to solve further another problem of the present invention, the present invention provides a transparent polyimide substrate for Oxide TFT or LTPS manufactured by using the polyimide precursor solution.

Advantageous Effects

The present invention provides a polyimide precursor solution, which can enhance uniformity and yield of a polyimide film as well as improving process efficiency by improving the dewetting problem in a coating process of the polyimide precursor solution. Further, the polyimide according to the present invention containing a specific structure can be used in various fields such as a substrate for a device, a cover substrate for a display, an optical film, an Integrated circuit (IC) package, an adhesive film, a multi-layer flexible printed circuit (FPC), a tape, a touch panel and a protection film for an optical disk due to its excellent transparency, heat resistance, mechanical strength and flexibility.

MODE FOR INVENTION

Various changes in form and details may be made to the presently disclosed embodiment and thus should not be construed as being limited to the aspects set forth herein. The presently disclosed embodiment is not limited to the aspects described in the present description, and thus it should be understood that the presently disclosed embodiment does not include every kind of variation example or alternative equivalent included in the spirit and scope of the presently disclosed embodiment. Also, while describing the aspects, detailed descriptions about related well-known functions or configurations that may diminish the clarity of the points of the aspects of the presently disclosed embodiment will be omitted.

Unless particularly stated otherwise herein, all the compounds or organic groups may be substituted or unsubstituted. Herein, the term 'substituted' means that at least one hydrogen atom in such a compound or substituent has been replaced by any one substituent selected from the group consisting of a halogen atom, a $C_{1-10}$ alkyl group, a halogenated alkyl group, a $C_{3-30}$ cycloalkyl group, a $C_{6-30}$ aryl group, a hydroxyl group, a $C_{1-10}$ alkoxyl group, a carboxyl group, an aldehyde group, an epoxy group, a cyano group, a nitro group, an amino group, a sulfonic acid group and derivatives thereof.

Further, unless particularly stated otherwise herein, the term 'combination thereof' means that two or more functional groups are bonded by a single bond, a double bond, a triple bond or a linking group such as a $C_{1-10}$ alkylene group (e.g., methylene group (—$CH_2$—), ethylene group (—$CH_2CH_2$—), etc.), a $C_{1-10}$ fluoroalkylene group (e.g., fluoromethylene group (—$CF_2$—), a perfluoroethylene group (—$CF_2CF_2$—), etc.), a hetero atom such as N, O, P, S or Si, or a functional group containing thereof (e.g., intramolecular carbonyl group (—C=O—), ether group (—O—), ester group (—COO—), heteroalkylene group containing —S—, —NH—, —N=N—, etc.), or two or more functional groups are connected by condensation.

Flexible devices with a high temperature process require heat resistance at high temperature, and particularly, in the case of an organic light emitting diode (OLED) device using Oxide TFT and low temperature polycrystalline silicon (LTPS) processes, the process temperature sometimes comes close to 350° C. or higher, 500° C.

At this temperature, even polyimide with excellent heat resistance is easily pyrolyzed. Accordingly, in order to manufacture flexible devices, it is needed to develop polyimide which can exhibit excellent chemical resistance and storage stability because hydrolysis is prevented, and also exhibits excellent thermal stability while maintaining high transparency at high temperature, together with enough mechanical properties.

Further, when coating a polyimide precursor solution on a substrate, in order to make the viscosity of the solution possible to be coated, the solute concentration should be lowered. However, when the solute concentration is increased to increase productivity, there was a problem that it is difficult to coat the solution due to the increased solution viscosity. Further, polyimide precursor solution has problems that it has low long-term preservability under a humidity condition, and it is very difficult to preserve the solution for a long period of time while maintaining the degree of polymerization. And in the case of the precursor solution coated on a substrate, the dewetting phenomenon that the coated solution is curled from the edge may occur, and this phenomenon may affect the cutting ability, the yield and the like of the polyimide film later.

The present invention is objected to develop a transparent PI substrate material for Oxide TFT and LTPS with reduced shrinkage behavior by introducing a structure which shows expansion behavior by using a polyimide structure having severe in-plane thermal shrinkage behavior.

One object of the present invention is to provide a polyimide precursor solution which can solve the dewetting problem during the coating process and can manufacture a polyimide film having the ultra-high heat resistance at the same time.

Another object of the present invention is to provide a polyimide film manufactured by using the polyimide precursor solution and a method for manufacturing the same.

The polyimide precursor solution of the present invention comprises:

(a) a polyimide precursor manufactured by reacting monomers of the following Chemical Formulas 1, 2 and 3; and

(b) an organic solvent having Log P as a positive value, wherein the polyimide precursor solution has a dewetting ratio of 0% to 0.1% as defined by the following Formula 1:

Dewetting ratio (%)=[(A−B)/A]×100    [Formula 1]

wherein,

A: The area of the polyimide precursor solution in the state that the polyimide precursor solution was completely coated on the substrate (100 mm×100 mm);

B: The area of the polyimide precursor solution or the polyimide (PI) film after the polyimide precursor solution or the polyimide film is rolled up from the end of the coated substrate:

[Chemical Formula 1]

[Chemical Formula 2]

[Chemical Formula 3]

wherein, $R_1$, $R_2$, $R_3$ and $R_4$ may be each independently a substituent selected from a halogen atom consisting of —F, —Cl, —Br and —I, a hydroxyl group (—OH), a thiol group (—SH), a nitro group (—$NO_2$), a cyano group, a $C_{1-10}$ alkyl group, a $C_{1-4}$ halogenoalkoxyl group, a $C_{1-10}$ halogenoalkyl group, and a $C_{6-20}$ aryl group, and preferably, it may be a substituent selected from a halogen atom, a halogenoalkyl, an alkyl group, an aryl group and a cyano group. For example, the halogen atom may be fluorine (—F), the halogenoalkyl may be a $C_{1-10}$ fluoroalkyl containing a fluorine atom selected from a fluoromethyl group, a perfluoroethyl group, a trifluoromethyl group and the like, the alkyl group may be selected from a methyl group, an ethyl group, a propyl group, an isopropyl group, a t-butyl group, a pentyl group and a hexyl group, and the aryl group may be selected from a phenyl group and a naphthalenyl group. More preferably, the substituent may be a fluorine atom and a fluoroalkyl group containing a fluorine atom.

$Q_1$ may be selected from the group consisting of —O—, —$CR_{18}R_{19}$—, —C(=O)—, —C(=O)O—, —C(=O)NH—, —S—, —$SO_2$—, a phenylene group and a combination thereof, wherein $R_{18}$ and $R_{19}$ may be each independently selected from the group consisting of a hydrogen atom, a $C_{1-10}$ alkyl group and a $C_{1-10}$ fluoroalkyl group.

$Q_2$ may be selected from the group consisting of a single bond, —O—, —$CR_{18}R_{19}$—, —C(=O)—, —C(=O)O—, —C(=O)NH—, —S—, —SO$_2$—, a phenylene group and a combination thereof, wherein $R_{18}$ and $R_{19}$ may be each independently selected from the group consisting of a hydrogen atom, a $C_{1-10}$ alkyl group and a $C_{1-10}$ fluoroalkyl group.

Herein, the term 'fluorine-based substituent' means not only 'fluorine atom substituent' but also 'substituent containing a fluorine atom'.

In the process coating the polyimide precursor solution on a glass substrate, the solution may be dewetted due to shrinkage of the coated layer when curing or storing the coating solution under a humidity condition.

This dewetting phenomenon of the coating solution may cause variation in thickness of a film. Especially, when there is a very small foreign material, the dewetting is started from the foreign material and sporadically increases the thickness of the film. Accordingly, due to lack of flexibility of the film, the film may be cut or edges may be broken when cutting, resulting in poor working performance and reduced yield.

Such dewetting phenomenon of the polyimide precursor solution and the film may occur within 30 min after coating the polyimide precursor solution, and particularly, because the dewetting is started from the edge, the thickness of the edge may increase.

After coating the polyimide precursor solution according to the present invention on a substrate and then storing thereof for 10 min or longer, for example, 10 min or longer, for example, 40 min or longer under a humidity condition, the dewetting ratio of the coated polyimide precursor solution may be 0.1% or less. For example, even after storing at a temperature of 20° C. to 30° C. and under a humidity condition of 40% or more, more specifically, under a humidity condition of a range from 40% to 80%, i.e., 40%, 50%, 60%, 70% and 80%, respectively, for example, 50%, for 10 min to 50, the dewetting ratio may be very low as 0.1% or less, preferably 0.05%, more preferably near 0%.

Such dewetting ratio is also maintained after curing. For example, after coating the polyimide precursor solution on a substrate, storing thereof for 10 min or longer, for example, at a temperature of 20° C. to 30° C. and under a humidity condition of 40% or more, more specifically, under a humidity condition of a range from 40% to 80%, i.e., 40%, 50%, 60%, 70% and 80%, respectively, for example, storing under a humidity condition of 50% for 10 min to 50 min and then curing thereof at 320° C. or higher, the dewetting ratio of the polyimide film thus obtained may be 0.1% or less. In other word, there may be little or no curling in the curing process by heat-treatment, and specifically, the dewetting ratio may be 0.05%, more preferably near 0%.

The polyimide precursor solution according to the present invention can solve this dewetting phenomenon, thus more improving the yield of a manufacturing process by obtaining a polyimide with more uniform characteristics.

According to one embodiment of the present invention, in a synthesis reaction of tetracarboxylic dianhydride represented by the Chemical Formulas 1 and 2 and diamine represented by the Chemical Formula 3, the tetracarboxylic dianhydride may preferably be reacted in a more amount than the diamine, for example, the compound may preferably be reacted at a molar ratio of a range from 1:0.98 to 1:0.99.

Further, based on the total content of the tetracarboxylic dianhydride of Chemical Formulas 1 and 2, the content of the tetracarboxylic dianhydride containing the structure represented by the Chemical Formula 2 may be 13 mol % to 27 mol %, preferably 15 mol % to 25 mol %. The compound containing the structure of the Chemical Formula 2 (for example, 4,4'-(hexafluoroisopropylidene)diphthalic anhydride (6FDA)) reduces the in-plane shrinkage characteristic of the compound represented by the Chemical Formula 1 (for example, pyromellitic dianhydride (PMDA)) caused by heat. Thus, it can improve the shrinkage of the film occurred during a cooling process after a heating process, and thereby, the CTE value in the cooling after heating process may be a positive value.

For example, the polyimide film according to the present invention may have the coefficient of thermal expansion (CTE) of 0 ppm/° C. to 15 ppm/° C., more preferably 0 ppm/° C. to 10 ppm/° C. after heating and then cooling the polyimide film n+1 times (n is an integer equal to or greater than 0) in a range from 100° C. to 450° C.

Further, the haze of the polyimide film according to the present invention may be 1 or less, and a polyimide film with improved transparency, which has the haze value of preferably 0.9 or less, or 0.7 or less, more preferably 0.5 or less, can be provided. At this time, the thickness of the polyimide film may be 8 μm to 15 μm, preferably 10 μm to 12 μm.

According to one embodiment, the compound of Chemical Formula 2 may be at least one selected from the compounds of Chemical Formulas 2a to 2g.

(2a)

(2b)

(2c)

(2d)

(2e)

(2f)

(2g)

According to one embodiment, the compound of Chemical Formula 3 may be selected from the compound represented by the following Chemical Formulas 3a to 3d.

(3a)

(3b)

(3c)

(3d)

In the Chemical Formulas 3a to 3d, Q1 has the same meanings as defined above.

The polyimide precursor according to the present invention may comprise a repeating structure represented by the following Chemical Formulas 4a and 4b.

[Chemical Formula 4a]

[Chemical Formula 4b]

In the total content of the repeating structures of Chemical Formulas 4a and 4b, the compound of Chemical Formula 4b may be contained in the content of 13 mol % to 27 mol %, more preferably 15 mol % to 25 mol %.

The structure of Chemical Formula 4a is a polyimide structure with severe thermal shrinkage behavior by cooling in the heating and cooling process, and the structure of Chemical Formula 4b is a structure with thermal expansion behavior. Thus, by polymerizing the polyimide structures having different characteristics in a proper ratio, the heat resistance of the film in the heating and cooling process can be optimized.

The reaction of the tetracarboxylic dianhydride with the diamine may be performed according to the conventional diamine polyimide precursor polymerization method such as solution polymerization. Specifically, the polyimide precursor can be manufactured by dissolving the diamine in an organic solvent, adding the tetracarboxylic dianhydride and dicarboxylic acid or dicarboxyl chloride to the mixed solution thus obtained and then polymerizing thereof.

The reaction can be performed under inert gas or nitrogen atmosphere, and also can be performed in an anhydrous condition.

Further, the polymerization reaction can be performed at a temperature of −20° C. to 60° C., preferably 0° C. to 45° C. If the reaction temperature is too high, molecular weight may be increased due to increased reactivity, and the viscosity of the precursor composition may be increased. Thus, it may be disadvantageous in the process.

Further, the organic solvent, which can be used in the polymerization reaction, may be a solvent having the partition coefficient (Log P value) at 25° C. as a positive value and the boiling point of 180° C. or lower, and more specifically the solvent may have the partition coefficient (Log P value) of 0.01 to 3, 0.01 to 2, or 0.01 to 1.

The partition coefficient may be calculated by using an ACD/Log P module of ACD/Percepta platform (ACD/Labs), and the ACD/Log P module uses algorithm based on Quantitative Structure-Property Relationship (QSPR) methodology which uses a 2D structure of a molecule.

The positive value of the partition coefficient means the polarity of the solvent is hydrophobic. According to the study of the present inventors, it can be found that the dewetting characteristic of the solution may be improved by manufacturing a polyimide precursor solution using a specific solvent with the positive partition coefficient value and then manufacturing a polyimide precursor solution using thereof. Further, the present invention can control the dewetting phenomenon of the solution by using a solvent having the positive Log P value, without using additives such as a leveling agent, which adjusts the surface tension of a material and the smoothness of a film. Because of not using additional additives, the present invention has effect of removing the problems on quality and process, for example, a problem that a low molecular weight material is contained in the final product, and forming a polyimide film with uniform characteristic more efficiently.

Further, when fine polar foreign materials are introduced into the polyimide precursor solution coated on a substrate, in the polyimide precursor solution containing a polar solvent having the negative Log P value, sporadic cracks and thickness change of the coating may be formed based on the position of the foreign material due to the polarity of the foreign material, but in the case of using a hydrophobic solvent having the positive Log P value, the change of the thickness caused by the cracks of the coating may be reduced or inhibited even in that case that the fine polar foreign materials are introduced.

Further, the density of the solvent according to the present invention may be measured by a standard measuring method of ASTM D1475, and it may be 1 g/cm$^3$ or less. If the density is more than 1 g/cm$^3$, the relative viscosity may be increased and therefore the process efficiency may be reduced.

The solvent which can be used in the present invention may be selected from N,N-diethylacetamide (DEAc), N,N-diethylformamide (DEF), N-ethylpyrrolidone (NEP), dimethylpropanamide (DMPA), diethylpropanamide (DEPA) or a mixture thereof.

Further, the polyimide according to the present invention may have a weight average molecular weight of 10,000 to 200,000 g/mol, 20,000 to 100,000 g/mol or 30,000 to 100,000 g/mol. Further, the polyimide according to the present invention may have a molecular weight distribution (Mw/Mn) of 1.1 to 2.5, preferably. If the weight average molecular weight or molecular weight distribution of the polyamide-imide is out of the range defined above, there may be a difficulty in forming the film or there is a risk that the characteristics of the polyimide-based film such as transmittance, heat resistance and mechanical properties may be deteriorated.

Then, a transparent polyimide film can be manufactured by imidizing the polyimide precursor thus obtained from the above polymerization reaction. At this time, specifically, the imidization process may be performed by a chemical imidization method or a thermal imidization method.

For example, the polyimide can be obtained by a imidization method using chemical reaction in which a dehydrating agent and an imidization catalyst is added to the polymerized polyimide precursor solution and then the resulting solution is heated at a temperature of 50° C. to 100° C., or by a imidization method in which alcohol is removed while refluxing the above solution.

In the chemical imidization method, the imidization catalyst may be pyridine, triethylamine, picoline or quinoline and the like, and in addition, it may be substituted or unsubstituted nitrogen-containing heterocyclic compounds, N-oxide compounds of a nitrogen-containing heterocyclic compound, substituted or unsubstituted amino acid compounds, aromatic hydrocarbon compounds having a hydroxyl group or aromatic heterocyclic compounds. In particular, the catalyst may be imidazole derivatives such as lower alkylimidazoles, for example, 1,2-dimethylimidazole, N-methylimidazole, N-benzyl-2-methylimidazole, 2-methylimidazole, 2-ethyl-4-methylimidazole, 5-methylbenzimidazole and the like; substituted pyridines, for example, isoquinoline, 3,5-dimethylpyridine, 3,4-dimethylpyridine, 2,5-dimethylpyridine, 2,4-dimethylpyridine, 4-n-propylpyridine and the like; p-toluene sulfonic acid and the like.

The dehydrating agent may be an acid anhydride such as acetic acid anhydride.

The polyimide precursor solution may be in the form of a solution dissolved in an organic solvent, and in this case, for example, when the polyimide precursor is synthesized in the organic solvent, the solution may be the reaction solution thus obtained itself or a solution obtained by diluting the reaction solution with another solvent. Further, when the polyimide precursor is obtained as solid powder, the solution may be a solution obtained by dissolving the powder in an organic solvent.

The polyimide precursor solution manufactured by the manufacturing method mentioned above may contain the solid in such an amount that the solution has an appropriate viscosity considering its film formation processability such as coatability. According to one embodiment, the content of the solution may be controlled to have the total content of the polymer of 5 to 20 wt %, preferably 8 to 18 wt %, more preferably 8 to 12 wt %.

Or the content of the solution may be controlled such that the polyimide precursor solution has viscosity of 2,000 cP or higher or 3,000 cP or higher, and the viscosity of the polyimide precursor solution may be controlled to 10,000 cP or less, preferably 9,000 cP or less, more preferably 8,000 cP or less. If the viscosity of the polyimide precursor solution is more than 10,000 cP, the process efficiency may be deteriorated due to reduced defoamation efficiency when processing the polyimide film, and also electrical, optical and mechanical properties of the film may be deteriorated due to bad surface profile caused by bubble formation.

After coating the polyimide precursor solution on a substrate, the solution can be heat-treated in an IR oven or a hot air oven, or on a hot plate, and the heat-treatment for curing may be performed at a temperature ranging from 300° C. to 500° C., preferably 320° C. to 450° C., for example, 320° C. to 400° C., and also may be performed by multi-step heating within the above temperature range. The heat-treating process may be performed for 20 min to 70 min, preferably 20 min to 60 min.

The organic solvent contained in the polyimide precursor solution of the present invention may be the same organic solvent used for the above synthesis reaction.

In a range that does not have an influence upon the effect of the present invention a coupling agent, a crosslinkable compound, an imidization catalyst for effectively proceeding imidization and the like can be added.

According to one embodiment, the polyimide precursor solution may further comprise an alkoxysilane compound, and the alkoxysilane compound may be selected from the compounds represented by the following Chemical Formulas 6a to 6d.

[Chemical Formula 6a]

[Chemical Formula 6b]

[Chemical Formula 6c]

[Chemical Formula 6d]

According to one embodiment, the residual stress of a support, which comprises the polyimide manufactured by imidizing the polyimide precursor, may be in a range from −5 MPa to 10 MPa, and the absorbance at 308 nm of a DEAc solution comprising the alkoxysilane compound in an amount of 0.001 wt % may be in a range from 0.1 to 0.5 at 1 cm of the measured thickness of the solution. The absorbance may be measured with UV-1600 (Shimadzu Corporation) after filling the DEAc solution comprising the alkoxysilane compound in an amount of 0.001 wt % in a quartz cell with the measured thickness of 1 cm.

The alkoxysilane compound may be synthesized by reacting acid dianhydride and a trialkoxysilane compound, reacting acid anhydride and a tri alkoxysilane compound, or reacting an amino compound and isocyanate tri alkoxysilane compound. The acid dianhydride, acid anhydride and amino compound may preferably have an aromatic ring (in particular, a benzene ring), respectively.

The content of the alkoxysilane compound may be properly adjusted within a range expressing sufficient adhesiveness and detachment result, and preferably, the alkoxysilane compound may be contained in an amount of 0.01 wt % to 20 wt %, based on the polyimide 100 wt %. A resin film obtained when the content of the alkoxysilane compound based on the polyimide 100 wt % is in a range of 0.01 wt % or more can obtain excellent adhesive force to a support. Further, the content of the alkoxysilane compound of 20 wt % or less may be preferable in terms of the storage stability of the polyimide precursor solution. The content of the alkoxysilane compound may preferably be 0.02 wt % to 15 wt %, more preferably 0.05 wt % to 10 wt %, most preferably 0.1 wt % to 8 wt %, based on the polyimide.

Further, the polyimide-based film may be a colorless and transparent polyimide film having a thickness of 5 μm to 20 μm, a haziness of 1 or less, preferably 0.9 or less, or 0.7 or less, more preferably 0.5 or less within the above thickness range, a transmittance of at least 80% to light at a wavelength of 380 nm to 760 nm within the film thickness of 5 µm to 30 µm, and a yellowness index (YI) of about 25 or less, preferably about 20 or less or about 5 or less, more preferably about 16 or less, or 15 or less. The film can exhibit markedly improved transparency and optical properties due to its excellent light transmittance and yellowness index.

Further, the polyimide-based film may be an anisotropic film having an in-plane retardation ($R_{in}$) of about 0 to about 100 nm and a thickness retardation ($R_{th}$) of at least about 200 nm, or an in-plane retardation ($R_{in}$) of about 0 to about 70 nm and a thickness retardation ($R_{th}$) of at least about 300 nm.

Further, the birefringence of in-plane and thickness direction of the polyimide according to the present invention is the difference between the in-plane refractive index and the thickness direction refractive index, and it may preferably be 0.05 to 0.25. If the birefringence of in-plane and thickness direction of the polyimide is less than 0.05, when the polyimide is used as a retardation film, it is needed to make the polyimide thicker, and depending on application, the coloration of the soluble polyimide may be a problem. If the birefringence of in-plane and thickness direction is more than 0.25, it may be difficult to control the thickness of the polyimide layer in the application requiring expression of the uniform birefringence characteristic. On the other hand, the birefringence of in-plane and thickness direction is not necessarily the value specified in the thickness, but particularly, it may be attained in the thickness, preferably from 1 µm to 40 µm, more preferably from 1 µm to 30 µm, most preferably from 5 µm to 25 µm, especially about 20 µm.

Thus, in another embodiment of the present invention, an article comprising the polyimide copolymer is provided.

The article may be a film, a fiber, a coating material, an adhesive and the like, but not limited thereto. The article may be formed by a dry/wet method, a dry method, a wet method and the like using a composite composition of the copolymer and inorganic particles, but not limited thereto. Specifically, as described above, the article may be an optical film, and in this case, the composition comprising the polyimide copolymer may be easily manufactured by being applied on a substrate through a spin coating method followed by being dried and cured.

The polyimide according to the present invention can maintain characteristics such as heat resistance, mechanical strength and the like due to its rigid structure, in particular, excellent heat resistance against thermal shrinkage behavior which can occur during a high temperature process, and also exhibit excellent colorless and transparent characteristics. Thus, it can be used in various fields such as a substrate for a device, a cover substrate for a display, an optical film, an integrated circuit (IC) package, an adhesive film, a multilayer flexible printed circuit (FPC), a tape, a touch panel, a protection film for an optical disk and the like.

According to another embodiment of the present invention, a display device comprising the article is provided. Specifically, the display device may be a liquid crystal display device (LCD), an organic light emitting diode (OLED) and the like. In particular, the polyimide may be suitable for an OLED device which uses a LTPS (low temperature polycrystalline silicon) process requiring a high temperature process, but not limited thereto.

Best Mode Carrying Out the Invention

The present invention will be explained in detail with reference to the following examples, including test examples. However, these examples are provided for illustrative purposes only and are not intended to limit the scope of the invention.

EXAMPLE

<Example 1>
TFMB(0.99)/PMDA(0.85)_6FDA(0.15)

100 g of N,N-diethylacetamide (DEAc, partition coefficient: 0.32, density: 0.9130 g/cm$^3$) was filled in a reactor under nitrogen atmosphere, and then 12 g of 2,2'-bis(trifluoromethyl)-4,4'-biphenyl diamine (TFMB) was dissolved while maintaining the temperature of the reactor to 25° C. 7 g of Pyromellitic Dianhydride (PMDA) and 2.5 g of 4,4'-(Hexafluoroisopropylidene)diphthalic anhydride (6FDA) were added to the TFMB solution at the same temperature, and dissolved with stirring for a predetermined period of time. DEAc was added to the polyimide precursor solution prepared from the above reaction to make the solid concentration 10 wt % to 10.5 wt %. Viscosity of the polyimide precursor solution thus obtained was 6,300 cp.

<Example 2>
TFMB(0.99)/PMDA(0.80)_6FDA(0.20)

100 g of N,N-diethylacetamide (DEAc) was filled in a reactor under nitrogen atmosphere, and then 12.7 g of 2,2'-bis(trifluoromethyl)-4,4'-biphenyl diamine (TFMB) was dissolved while maintaining the temperature of the reactor to 25° C. 7 g of Pyromellitic Dianhydride (PMDA) and 3.56 g of 4,4'-(Hexafluoroisopropylidene)diphthalic anhydride (6FDA) were added to the TFMB solution at the same temperature, and dissolved with stirring for a predetermined period of time. DEAc was added to the polyimide precursor solution prepared from the above reaction to make the solid concentration 10 wt % to 10.5 wt %. Viscosity of the polyimide precursor solution thus obtained was 6,800 cp.

<Example 3>
TFMB(0.99)/PMDA(0.75)_6FDA(0.25)

100 g of N,N-diethylacetamide (DEAc) was filled in a reactor under nitrogen atmosphere, and then 13.56 g of 2,2'-bis(trifluoromethyl)-4,4'-biphenyl diamine (TFMB) was dissolved while maintaining the temperature of the reactor to 25° C. 7 g of Pyromellitic Dianhydride (PMDA) and 4.75 g of 4,4'-(Hexafluoroisopropylidene)diphthalic anhydride (6FDA) were added to the TFMB solution at the same temperature, and dissolved with stirring for a predetermined period of time. DEAc was added to the polyimide precursor solution prepared from the above reaction to make the solid concentration 10 wt % to 10.5 wt %. Viscosity of the polyimide precursor solution thus obtained was 6,200 cp.

<Example 4>
TFMB(0.985)/PMDA(0.75)_6FDA(0.25)

100 g of N,N-diethylacetamide (DEAc) was filled in a reactor under nitrogen atmosphere, and then 13.49 g of 2,2'-bis(trifluoromethyl)-4,4'-biphenyl diamine (TFMB) was dissolved while maintaining the temperature of the reactor to 25° C. 7 g of Pyromellitic Dianhydride (PMDA) and 4.75 g of 4,4'-(Hexafluoroisopropylidene)diphthalic anhydride (6FDA) were added to the TFMB solution at the same temperature, and dissolved with stirring for a predetermined period of time. DEAc was added to the polyimide precursor solution prepared from the above reaction to make the solid concentration 10 wt % to 10.5 wt %. Viscosity of the polyimide precursor solution thus obtained was 5,300 cp.

<Example 5>
TFMB(0.98)/PMDA(0.75)_6FDA(0.25)

100 g of N,N-diethylacetamide (DEAc) was filled in a reactor under nitrogen atmosphere, and then 13.42 g of 2,2'-bis(trifluoromethyl)-4,4'-biphenyl diamine (TFMB) was dissolved while maintaining the temperature of the reactor to 25° C. 7 g of Pyromellitic Dianhydride (PMDA) and 4.75 g of 4,4'-(Hexafluoroisopropylidene)diphthalic anhydride (6FDA) were added to the TFMB solution at the same temperature, and dissolved with stirring for a predetermined period of time. DEAc was added to the polyimide precursor solution prepared from the above reaction to make the solid concentration 10 wt % to 10.5 wt %. Viscosity of the polyimide precursor solution thus obtained was 4,600 cp.

<Comparative Example 1>
TFMB(0.99)/PMDA(1.0)

100 g of N-methyl-2-pyrrolidone (NMP, partition coefficient: −0.28, density: 1.027 g/cm$^3$) was filled in a reactor under nitrogen atmosphere, and then 10.17 g of 2,2'-bis(trifluoromethyl)-4,4'-biphenyl diamine (TFMB) was dissolved while maintaining the temperature of the reactor to 25° C. 7 g of Pyromellitic Dianhydride (PMDA) was added to the TFMB solution at the same temperature, and dissolved with stirring for a predetermined period of time. NMP was added to the polyimide precursor solution prepared from the above reaction to make the solid concentration 10 wt % to 10.5 wt %. Viscosity of the polyimide precursor solution thus obtained was 9,500 cp.

<Comparative Example 2>
TFMB(0.99)/PMDA(0.85)_6FDA(0.15)

100 g of N-methyl-2-pyrrolidone (NMP) was filled in a reactor under nitrogen atmosphere, and then 12 g of 2,2'-bis(trifluoromethyl)-4,4'-biphenyl diamine (TFMB) was dissolved while maintaining the temperature of the reactor to 25° C. 7 g of Pyromellitic Dianhydride (PMDA) and 2.5 g of 4,4'-(Hexafluoroisopropylidene)diphthalic anhydride (6FDA) were added to the TFMB solution at the same temperature, and dissolved with stirring for a predetermined period of time. NMP was added to the polyimide precursor solution prepared from the above reaction to make the solid concentration 10 wt % to 10.5 wt %. Viscosity of the polyimide precursor solution thus obtained was 8,600 cp.

Test Example 1

Each of the polyimide precursor solutions manufactured in Examples 1 to 5 and Comparative Examples 1 and 2 was stirred using an agitator at 1000 rpm for 30 min, and then aliquoted in a 20 ml vial in an amount of about 10 mg. Then, the solution was stored at normal temperature and pressure, and the defoaming time was measured. The results were listed in Table 1, and the defoaming characteristics of the polyimide precursor solutions of Comparative Examples 1 and 2 and Examples 1 and 2 over time were shown in FIG. 1.

TABLE 1

| | Composition (mol) | | | Polymerization | Solid Content | Viscosity | Defoaming Time |
|---|---|---|---|---|---|---|---|
| | PMDA | 6FDA | TFMB | Solvent | (wt %) | (cp) | (hour) |
| Comparative Example 1 | 1.0 | 0 | 0.99 | NMP | 10 | 9500 | 2 h |
| Comparative Example 2 | 0.85 | 0.15 | 0.99 | NMP | 10.1 | 8600 | 2 h |
| Example 1 | 0.85 | 0.15 | 0.99 | DEAc | 10.2 | 6300 | <1 h |
| Example 2 | 0.80 | 0.20 | 0.99 | DEAc | 10.3 | 6800 | <1 h |
| Example 3 | 0.75 | 0.25 | 0.99 | DEAc | 10.3 | 6200 | <1 h |
| Example 4 | 0.75 | 0.25 | 0.985 | DEAc | 10.3 | 5300 | <1 h |
| Example 5 | 0.75 | 0.25 | 0.98 | DEAc | 10.3 | 4600 | <1 h |

Figure 1:
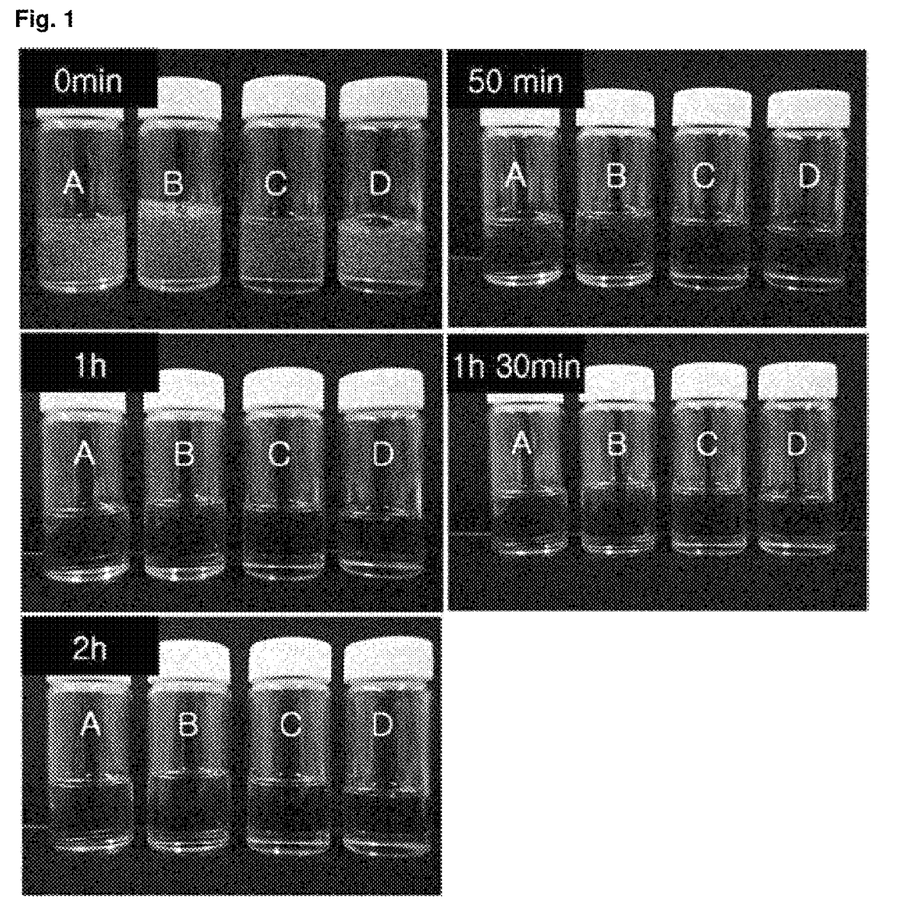
FIG. 1 shows the results of defoaming characteristics of the polyimide precursor solutions according to Examples and Comparative Examples over time (A: Comparative Example 1, B: Comparative Example 2, C: Example 1, D: Example 2).

From the results of the Table 1, it can be found that in the case of Examples using DEAc as a solvent, much lower viscosity can be obtained even in the polyimide precursor solution containing the solid in the same content, and therefore, the solution is advantageous to the process because the time taken to remove air bubbles formed in the solution, i.e., the defoaming time is remarkably reduced. FIG. 1 shows the results of measuring the defoaming characteristics of the polyimide precursor solutions according to Comparative Examples 1 and 2 (A, B) and Examples 1 and 2 (C, D) over time, and it can be found that in the composition of Examples 1 and 2 (C, D), the defoaming of the solution is completely finished within 1 hour. On the other hand, Comparative Examples 1 and 2 (A, B) show that air bubbles are still remained in the solution even after 1.5 hours and longer. Like this, the air bubbles remained in the solution may deteriorate the surface profile of the manufactured film, and also deteriorate electrical, optical and mechanical properties.

Test Example 2

Each of the polyimide precursor solutions manufactured in Examples 1 to 5 and Comparative Examples 1 and 2 was spin coated on a glass substrate to a predetermined thickness. Each thickness was listed in the following Table 2.

Figure 2:
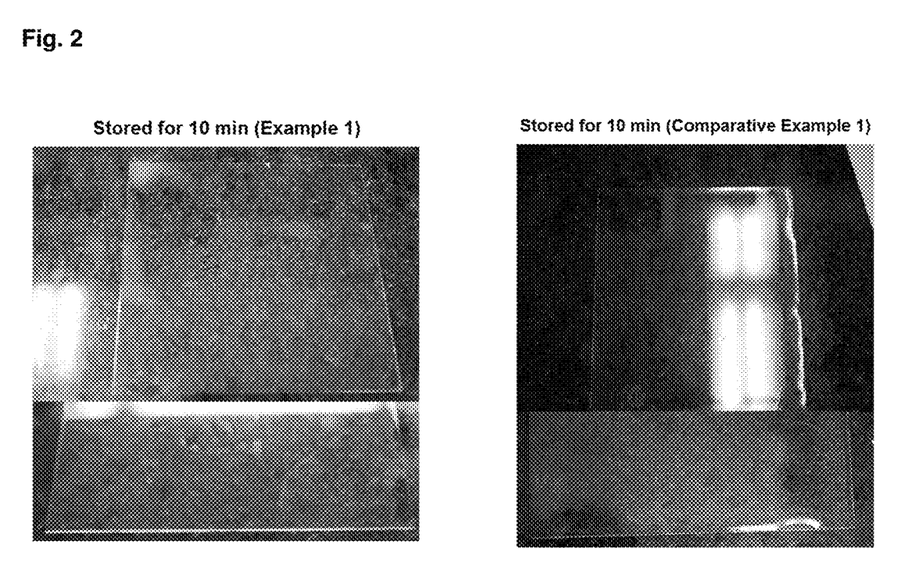
FIG. 2 shows the result of storing the glass substrates coated with the polyimide precursor solution according to Examples and Comparative Examples under a constant humidity condition for a predetermined time.

The polyimide precursor solution coated on a glass substrate (100 mm×100 mm) was stored at 26° C. and a humidity condition of 50% for 10 min to 40 min, and then the dewetting characteristic of each was observed. FIG. 1 and FIG. 2 show the results of observing the dewetting characteristic of the polyimide precursor solution manufactured in Comparative Examples 2 and Example 1 over time, and the dewettig ratio of each composition was listed in the following Table 2.

The polyimide precursor solution-coated glass substrate, which was stored at 26° C. and a humidity condition of 50% for a predetermined time, was put in an oven and heated at a rate of 4° C./min, and heat-treated at 350° C. for 30 min to perform a curing process. After the curing process is completed, the dewettig ratio of each film was measured and listed in the following Table 2, and the dewettig ratio of the film of Example 1 and Comparative Example 2 after curing was shown in FIG. 2.

At this time, the dewettig ratio is defined as the following Formula 1.

Dewettig ratio (%)=[(A−B)/A]×100  [Formula 1]

wherein,

A: The area of the polyimide precursor solution in the state that the polyimide precursor solution was completely coated on the substrate (100 mm×100 mm);

B: The area of the polyimide precursor solution or the polyimide (PI) film after the polyimide precursor solution or the polyimide film is rolled up from the end of the coated substrate.

In the definition of the dewettig ratio of the Formula 1, the area (B) of the polyimide precursor solution or the PI film after the dewettig phenomenon occurred was regarded as the area calculated based on the width of the part where the curling occurred inward from the edge of the end to the maximum and the length of the substrate.

TABLE 2

| | Thickness (μm) | Storing Time (min) | Dewettig ratio (%) before curing | Dewettig ratio (%) after curing |
|---|---|---|---|---|
| Comparative Example 1 | 9.5 | 10 | 1~5 | 10~20 |
| | | 20 | 1~8 | 10~30 |
| Comparative Example 2 | 10.2 | 10 | 1~5 | 10~20 |
| | | 20 | 1~8 | 10~30 |
| Example 1 | 10.4 | 10 | 0 | 0 |
| | | 40 | 0 | 0 |
| Example 2 | 10.3 | 40 | 0 | 0 |
| Example 3 | 10.3 | 40 | 0 | 0 |
| Example 4 | 10.3 | 40 | 0 | 0 |
| Example 5 | 10.3 | 40 | 0 | 0 |

Figure 3:
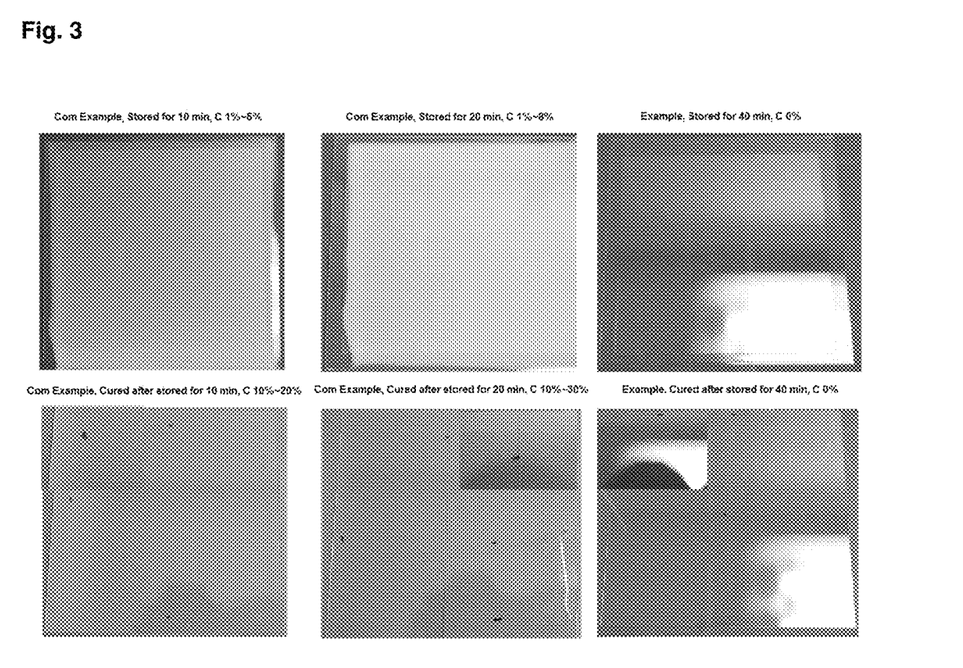
FIG. 3 shows the result of storing the glass substrates coated with the polyimide precursor solution according to Examples and Comparative Examples under a constant humidity condition for a predetermined time, and changes when curing the polyimide precursor solution after storing thereof.

As can be seen from the results of FIGS. 2 and 3 and the Table 2, it can be found that there was little or no dewetting phenomenon after storing the polyimide precursor solution according to the present invention at a humidity condition. Further, after curing, there was more severe dewetting phenomenon in the polyimide precursor solution of Comparative Example 2, but there was still little or no dewetting phenomenon in the polyimide precursor solution according to the present invention.

Test Example 3

Haze characteristic and CTE of the film was measured by the following method and the results were shown in Table 3.

Haze was measured by the method according to ASTM D1003 using Haze Meter HM-150.

The films were prepared in the size of 5 mm×20 mm, and a sample was loaded thereon using an accessory. The actual measured length of the films was same as 16 mm, and the force pulling the film was set to 0.02 N. The thermal expansion change pattern, when the first heating process was performed within the temperature ranging from 100° C. to 450° C. at a heating rate of 4° C./min and then the cooling process is performed within the temperature ranging from 450° C. to 100° C. at a cooling rate of 4° C./min, was measured with TMA (Q400, TA Instruments).

TABLE 3

| | Thickness (μm) | Haze | CTE (1$^{st}$ cooling from 450° C. to 100° C.) |
|---|---|---|---|
| Comparative Example 1 | 9.5 | 0.45 | −21 |
| Comparative Example 2 | 9.8 | 1.10 | 7.5 |
| Example 1 | 10.4 | 0.43 | 0.1 |
| Example 2 | 10.3 | 0.40 | 7.7 |
| Example 3 | 10.3 | 0.39 | 11 |
| Example 4 | 10.3 | 0.36 | 7.7 |
| Example 5 | 10.3 | 0.37 | 7.7 |

As shown in the Table 3, it can be found that the films of Examples 1 to 5 according to the present invention showed excellent CTE characteristic as well as excellent haze characteristic. On the other hand, the film of Comparative Example 1 showed excellent haze characteristic but big negative CTE value, and this means that the shrinkage characteristic according to the cooling after heating process is very big. Further, the film of Comparative Example 2, which contains the same precursor with the polyimide precursor of the present invention and uses a solvent with negative partition coefficient, i.e., NMP, showed good CTE characteristic but high haze, and also it showed high viscosity from the result of Test Example 1. Further, from the result of Test Example 2, the dewetting phenomenon occurred. Thus, the film is not preferable due to the deteriorated process efficiency.

<Example 6>
TFMB(0.98)/PMDA(0.85)_6FDA(0.15)/Alkoxysilane

N,N-diethylacetamide (DEAc, partition coefficient 0.32, density 0.9130 g/cm$^3$) 100 g was filled in a reactor under nitrogen atmosphere, and then 2,2'-bis(trifluoromethyl)-4,4'-biphenyl diamine (TFMB) 12 g was dissolved while maintaining the temperature of the reactor to 25° C. Pyromellitic Dianhydride (PMDA) 7 g and 4,4'-(Hexafluoroisopropylidene)diphthalic anhydride (6FDA) 2.5 g were added to the TFMB solution at the same temperature, and dissolved with stirring for a predetermined period of time. DEAc was added to the polyimide precursor solution prepared from the above reaction to make the solid concentration 10 wt % to 10.5 wt %. Viscosity of the polyimide precursor solution thus obtained was 6,300 cp.

A 50 ml flask was substituted with nitrogen. Then, DEAc 19.5 g, benzophenone tetracarboxylic dianhydride (BTDA) 2.42 g (7.5 mmol) and 3-aminopropyltriethoxysilane (Product name: LS-3150, Shin-Etsu Chemical) 3.321 g (15 mmol) were put thereinto and reacted at room temperature for 5 hours to obtain an alkoxysilane compound solution.

At this time, after filling the DEAc solution comprising the alkoxysilane compound in an amount of 0.001 wt % in a quartz cell with the measured thickness of 1 cm, the absorbance was measured with UV-1600 (Shimadzu Corporation), and the measured absorbance was 0.13.

The polyimide precursor solution 10 g and the alkoxysilane compound were well stirred in a vessel to prepare a polyimide precursor solution comprising the alkoxysilane.

Test Example 3

Adhesiveness, laser detachment and YI (converted by thickness 10 μm) of the polyimide precursor solution containing alkoxysilane of Example 6 were measured, and the results were listed in Table 4, respectively.

TABLE 4

| | Adhesiveness (gf/inch) | Laser intensity (mJ/cm$^2$) | Particle formation | YI |
|---|---|---|---|---|
| Example 6 | 870 | 220 | No | 6.6 |

<Comparative Example 3>
TFMB(0.99)/PMDA(0.6)_6FDA(0.1)_BPDA(0.3)

A polyimide film was manufactured at the same condition with Example 2 and at the curing condition listed in the following Table 5. In particular, in the case of Comparative Example 3, as acid dianhydride, 3,3',4,4'-biphenyltetracarboxylic dianhydride (BPDA) was used together.

TABLE 5

| Analysis item | Comparative Example 3 BPDA(0.3)_6FDA (0.1)_PMDA (0.6)/TFMB(0.99) | Example 2 6FDA(0.2)_PMDA (0.8)/TFMB(0.99) |
|---|---|---|
| Solid content (%) | 10.6 | 10.3 |
| Viscosity (cp) | 8,200 | 6,800 |
| Curing condition | 400° C. 50 min | 400° C. 50 min |
| Film thickness (µm) | 9.3 | 9.8 |
| Tg(° C.) | N.D | N.D |
| Haze | 2.5 | 0.3 |
| Yellowness index (YI) | 8.5 | 5.5 |

From the result of Table 5, it can be found that in the case of using BPDA as acid dianhydride, the polyimide precursor solution having the actually same solid content showed relatively high viscosity, and accordingly, the time taken to remove air bubbles formed in the solution, i.e., the defoaming time was remarkably increased, thereby being disadvantageous in the process. Further, it can be found that the film of Comparative Example 3 showed poor haze and yellowness index characteristics, compared to the film of Example 2.

Although specific embodiments of the present invention are described in detail as described above, it will be apparent to those skilled in the art that the specific description is merely desirable exemplary embodiment and should not be construed as limiting the scope of the present invention. Therefore, the substantial scope of the present invention is defined by the accompanying claims and equivalent thereof.

The invention claimed is:
1. A polyimide precursor solution comprising:
(a) a polyimide precursor comprising a repeating structure represented by the following Chemical Formulae 4a and 4b:

[Chemical Formula 4a]

[Chemical Formula 4b]

and
(b) an organic solvent having Log P as a positive value, wherein the polyimide precursor solution has a dewetting ratio of 0% to 0.1% as defined by the following Formula 1:

Dewetting ratio (%)=[(A−B)/A]×100    [Formula 1]

wherein,
A: The area of the polyimide precursor solution in the state that the polyimide precursor solution is completely coated on the substrate (100 mm×100 mm);
B: The area of the polyimide precursor solution or the polyimide (PI) film after the polyimide precursor solution or the polyimide film is rolled up from the end of the coated substrate;
wherein the repeating structure represented by Chemical Formula 4b is contained in the content of 13 mol % to 27 mol %, based on 100 mol % of the total content of repeating structures represented by Chemical Formulae 4a and 4b, and
wherein the organic solvent having a positive Log P value comprises diethylpropanamide (DEPA).
2. The polyimide precursor solution according to claim 1, wherein after coating the polyimide precursor solution on the substrate and then storing the substrate coated with the polyimide precursor solution at a temperature of 20° C. to 30° C. and a humidity of 40% to 80%, the coated polyimide precursor solution has a dewetting ratio of 0.1% or less.
3. The polyimide precursor solution according to claim 1, wherein after storing the substrate coated with the polyimide precursor solution at a temperature of 20° C. to 30° C. and a humidity of 40% to 80%, the substrate is cured at a temperature of 320° C. or higher to form a polyimide film having a dewetting ratio of 0.1% or less.
4. The polyimide precursor solution according to claim 1, wherein the repeating structure represented by Chemical Formula 4b is contained in the content of 15 mol % to 25 mol %, based on 100 mol % of the total content of repeating structures represented by Chemical Formulae 4a and 4b.
5. The polyimide precursor solution according to claim 1, wherein the density of the organic solvent is 1 g/cm$^3$ or less.
6. The polyimide precursor solution according to claim 1, which further comprises alkoxysilane.
7. The polyimide precursor solution according to claim 6, wherein after having coated the polyimide precursor solution onto a support, residual stress with the support demonstrated by a polyimide manufactured by imidizing the polyimide precursor is in a range from −5 MPa to 10 MPa, and the absorbance at 308 nm of a DEAc solution comprising the alkoxysilane compound in an amount of 0.001 wt % is in a range from 0.1 to 0.5 at 1 cm of the measured thickness of the solution.
8. The polyimide precursor solution according to claim 6, wherein the alkoxysilane comprises at least one structure selected from the compounds of the following Chemical Formulas 6a to 6d:

[Chemical Formula 6a]

[Chemical Formula 6b]

[Chemical Formula 6c]

[Chemical Formula 6d]

\* \* \* \* \*